US005634244A

United States Patent [19]

Fetsch et al.

[11] Patent Number: 5,634,244

[45] Date of Patent: Jun. 3, 1997

[54] CLASP FOR BEADED CHAINS

[76] Inventors: Rudolf Fetsch, Erasmus-Widmann-Str. 5, 97990 Welkersheim; Richard Frank, Paradiesweg 28, D-97996 Neiderstetten, both of Germany

[21] Appl. No.: 705,899

[22] Filed: Aug. 27, 1996

[30] Foreign Application Priority Data

Sep. 9, 1995 [DE] Germany ........................ 295 14 535.8

[51] Int. Cl.$^6$ ............................... E06B 9/00; F16G 11/00

[52] U.S. Cl. ............................. 24/115 F; 24/588; 24/459; 160/178.1

[58] Field of Search ............................. 24/588, 459, 464, 24/115 F, 3.4; 160/178.1 R

[56] References Cited

U.S. PATENT DOCUMENTS 3,757,031 9/1973 Izraell ....................................... 24/459
5,414,903 5/1995 Porteous .................................... 24/3.4
5,542,461 8/1996 Huang .................................. 24/115 F
5,560,414 10/1996 Judkins et al. ......................... 24/115 F
5,562,140 10/1996 Biba ..................................... 24/115 F

*Primary Examiner*—Victor N. Sakran

[57] ABSTRACT

The invention relates to a connecting clasp for beaded chains, which include a cord and bead bodies, wherein two sleeves, a socket sleeve and a plug sleeve, have an at least geometrical longitudinal axis, and can be plugged one into the other in the direction of the longitudinal axis, wherein the sleeves respectively have a sleeve shell with a sleeve head integrally connected to it, and at least one respective bead body can be received in the sleeves, wherein the internal diameter of the sleeves is greater than the external diameter of the bead bodies, and the sleeve shell of the socket sleeve has a shell internal surface and the sleeve shell of the plug sleeve has a shell external surface, respectively with releasably interengaging profiles. A bore is passed through the sleeve head along the longitudinal axis, to receive the cord, and a slot is formed on one side through the sleeve shell to the bore, for the introduction of the cord into the bore. The sleeves can be released from each other by a predetermined opening force.

7 Claims, 2 Drawing Sheets

Fig. 4b
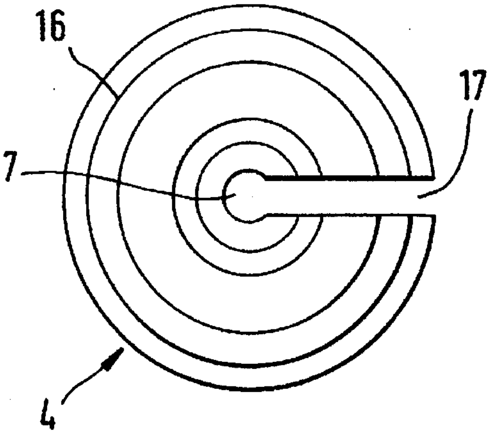
Fig. 2
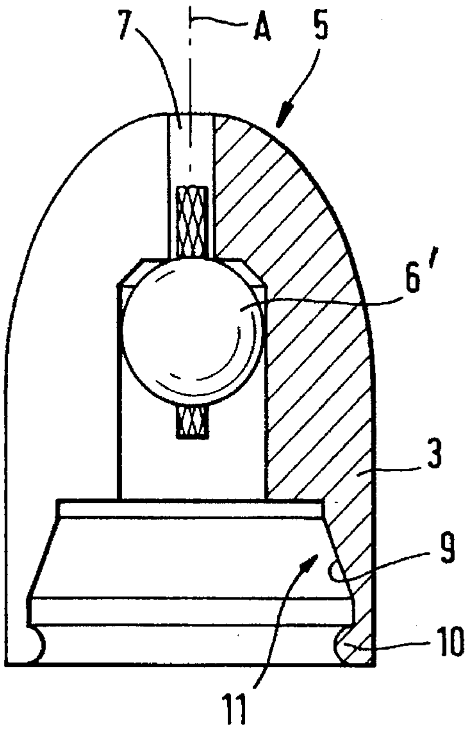
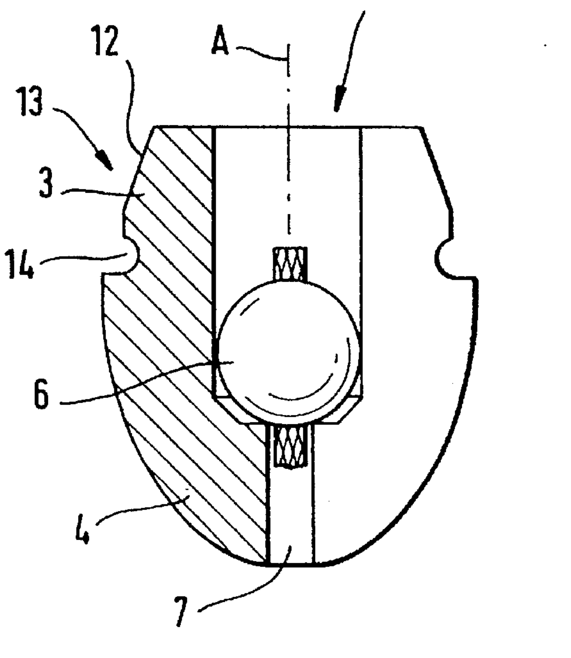
Fig. 3
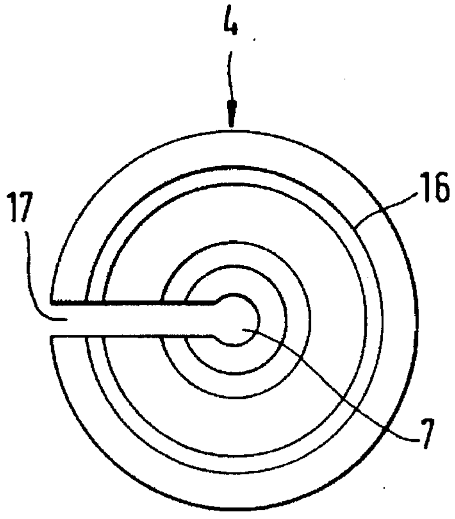
Fig. 4a

CLASP FOR BEADED CHAINS

BACKGROUND OF THE INVENTION

1. Field of the Invention

The invention relates to connecting clasps for beaded chains, which comprise a cord, and beads threaded and fastened on it.

2. Relevant Prior Art

The actuation of curtains or Venetian blinds, and also the interconnection of multiple curtains or Venetian blinds, in particular the horizontal connection of individual, vertically hanging segments of segmented curtains, takes place by means of beaded chains. Connecting clasps of the kind mentioned are preferably used in order to close the respective ends of a beaded chain or to be able to connect together the ends of two different beaded chains. In this case, the respective last beads of the beaded chain ends are taken up and held together by the connecting clasps.

Commercially available connecting clasps unite the received bead bodies in an unreleasable connection. It has been found in this case that the firmly united beaded chains can represent a considerable safety risk. For example, firmly united beaded chains can lead to the strangulation of children who play with curtains which are connected together with beaded chains or can be actuated by them. Furthermore, damage to the curtains and also to their hanging supports is possible if a momentary overload is applied by pulling excessively on the beaded chains connected to them, for example, by tripping over the beaded chain or by functional faults of the actuation of the supports of curtains or Venetian blinds.

SUMMARY OF THE INVENTION

The object of the invention is therefore to provide a connecting clasp for beaded chains by means of which the beaded chains are connected in a manner which is safe in accidents and which can prevent damage to curtains or Venetian blinds, and also to their supports, by excessive tension.

The object is achieved by means of a connecting clasp for beaded chains having a cord and bead bodies, which connecting clasp has a socket sleeve and a plug sleeve with an at least geometrical longitudinal axis and designed to be plugged one into the other in the direction of the longitudinal axis. Each of the sleeves comprises a sleeve shell and a sleeve head integrally connected with the sleeve shell. Each of the sleeves has an internal diameter that is larger than the external diameter of the bead bodies, and is designed to receive at least one bead body. The sleeve shell of the socket sleeve has a shell internal surface, and the sleeve shell of the plug sleeve has a shell external surface. The shell internal surface and the shell external surface have interengaging profiles. Each of the sleeve heads has a bore along the longitudinal axis through the sleeve head to receive the cord. Each of the sleeve shells has a slot on one side through the sleeve shell to the bore for introducing the cord into the bore. The sleeves are designed to be released from each other by a predetermined opening force.

A connecting clasp of this kind is advantageously suitable for receiving the respective last beads of the beaded chains in the respective sleeves, the socket sleeve and the plug sleeve, and thus for connecting together the ends of the beaded chains. Here the cord strands of the beaded chains are guided between the penultimate and the last bead bodies of a cord end into the one-sided opening through the sleeve shell to the bore in the sleeve head. In this manner, the beaded chain and the respective sleeve are fastened to each other so that the sleeve and the beaded chain ends can be separated from each other again. The sleeves are then reusable. The configuration of the surfaces of the sleeves with releasably interengaging profiles has the effect that the sleeves can be plugged into one another for the connection of the respective beaded chain ends, and the profiles mutually abut such that they can be released with a predetermined opening force. The opening force of the respective sleeves is chosen so that regular use of the beaded chain is possible on the supports provided for it.

In an embodiment of the invention, the shell surfaces of at least one sleeve shell can be fitted elastically to the shell surface of the respective other sleeve shell. Here the profiles of the shell surfaces are pushed one over the other when plugging the plug sleeve into the socket sleeve, until they completely interengage. On releasing the connection of the two sleeves, the profiled configuration requires a predetermined opening force until the profiles of the shell surfaces can be pushed over one another. Any suitable shapes are appropriate as profile configurations which satisfy the above-mentioned conditions as regards the opening force: in particular, tabs with corresponding recesses on the respective oppositely positioned shell surfaces, or sawtooth profiles, which counter the opening tension on the beaded chains with a resistance which corresponds to the predetermined opening force.

In a further embodiment of the invention, the opening force of the sleeves is in a region between 50N and 150N. This opening force is applied by pulling on the two sleeves in the two opposed directions of the longitudinal axis. The advantage of the thus predetermined force is that dangerous injuries by strangulation, particularly in the case of children, can be avoided, and the regular use of the beaded chains which are connected together or closed can take place without any restrictions.

In a further embodiment of the invention, the profiles of the surfaces are formed as collars or, respectively, as grooves. Here, on the one hand, the profiles are provided with a shape which has both retaining collars and retaining grooves, which respectively correspond to each other. On the other hand, surfaces of the sleeve exterior are provided which have profiles having either a retaining collar or a retaining groove. This embodiment is particularly advantageous, as against other closure possibilities, in the case of frequent opening and closing, since the sleeve material hardly wears at all at the profiles of the surfaces due to rubbing together during plugging in or releasing.

The connecting clasp according to a further embodiment of the invention represents a special design, in which the sleeves are made substantially radially symmetrical. This embodiment has the advantage that the profiles of the sleeve shells, both the shell external surface of the plug sleeve and also the corresponding shell inner surface of the receiving sleeve, can be formed with a profile around the whole circumference. This results in sleeves which are simple to manufacture.

Moreover, the beaded chains can be easily installed on the respective sleeves, and the frictional locking of the two sleeves when the connection is completely closed is provided in the whole region of the profile surfaces. The slot provided radially through the sleeve surface on one side has the effect that when the sleeves are released from their connection, their profile surfaces remain in abutment over the whole circumference. Forces which act radially are thereby produced, but are uniformly distributed on the sleeve surfaces. This uniform distribution leads to less wear of the profile surfaces and thus to a smaller resulting change in the opening force. Furthermore, the sleeve walls are only minimally loaded by the uniform force distribution, so that the material properties remain unchanged, even with frequent actuation of a connecting clasp.

In a special configuration of this embodiment, a seating region is formed on the profile surface of the sleeve shell of the plug sleeve, running conically outwards. With this seating region, it is possible to center the plug sleeve on the shell inner surface of the socket sleeve in order to plug it in. This facilitates the plugging together of the two sleeves. In order to attain a corresponding abutment of the seating region of the plug sleeve on the shell inner surface of the socket sleeve, an internal, conical profile is provided in an abutment region of the shell inner surface.

In a further configuration of this embodiment, the plug sleeve is formed with a retaining groove on its profile surface, by means of which both sleeves are held together. When releasing the connection, the opening force must first press the shell wall of the socket sleeve apart, in order to push the retaining groove over the edge of the retaining collar.

After this, the plug sleeve slides on its conical seating surface over the retaining collar of the socket sleeve and out of the latter, under the pressing force of the shell wall of the socket sleeve, which is thereby spread apart. In this case, no further tensile force is required. This has the advantageous effect of preventing the misalignment of the sleeves, which can lead to an increase in the opening force or to failure of the opening of the connecting clasp.

DESCRIPTION OF THE DRAWINGS

Preferred embodiments of the invention, with reference to the drawings will now be described, in which:

FIG. 2 shows a socket sleeve,

FIG. 3 shows a plug sleeve,

FIG. 4(*a*) shows a socket sleeve in a plan view of the sleeve head, and

FIG. 4(*b*) shows a plug sleeve in a plan view of the sleeve head.

DESCRIPTION OF PREFERRED EMBODIMENTS

Figure 1:
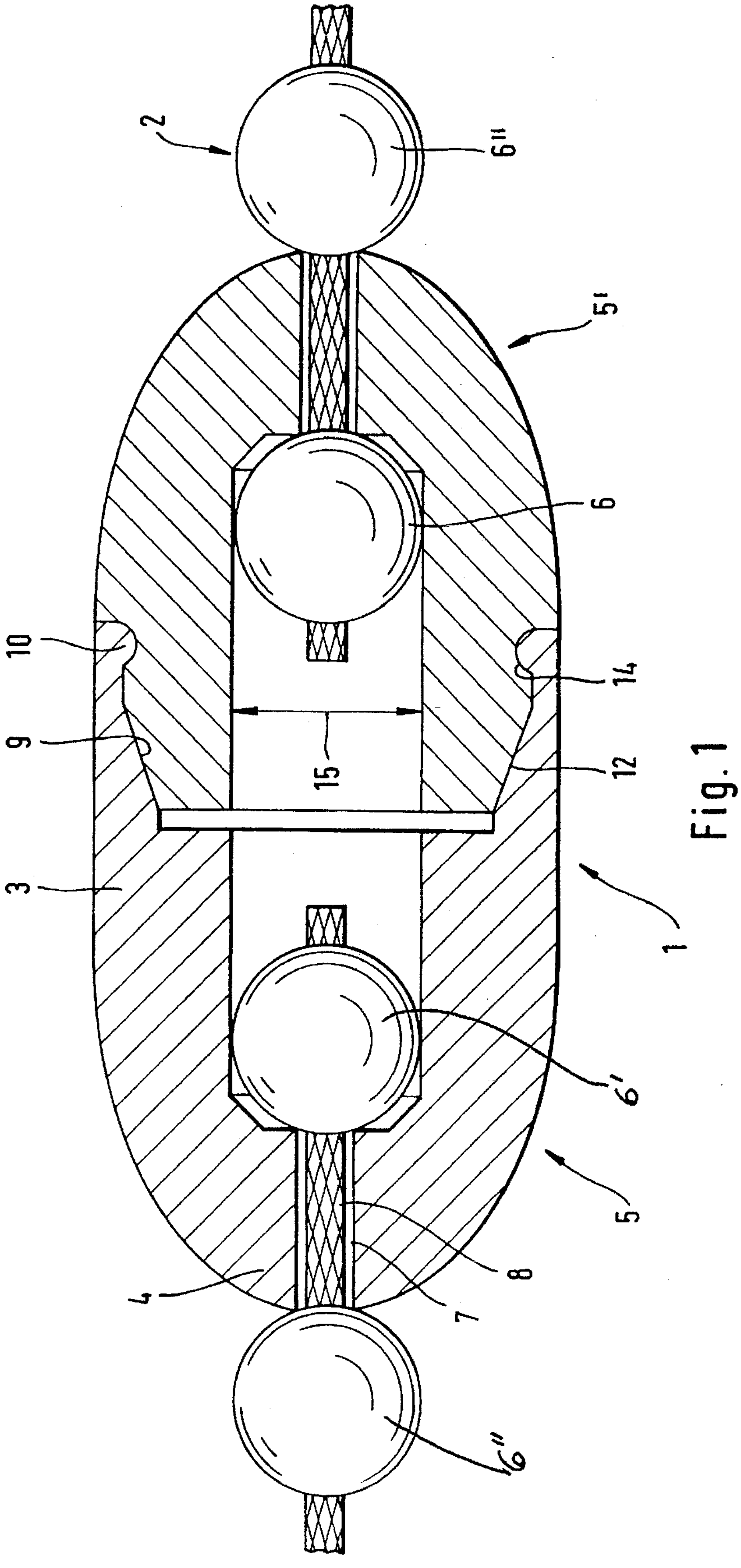
FIG. 1 shows a connecting clasp.

FIG. 1 shows in cross section a connecting clasp 1 for a beaded chain 2 with rotationally symmetrical sleeves 5, 5', a plug sleeve 5' plugged into a socket sleeve 5, with sleeve shell 3 and sleeve head 4. Two bead bodies 6, 6' are seated in the connecting clasp 1, and are the last elements of the beaded chains to be connected. The two sleeves 5, 5' are respectively fastened between the last and the penultimate bead bodies 6, 6", and 6', 6'" so that after the connection is released, the two sleeves 5, 5' do not themselves separate from the beaded chain 2. The sleeves 5, 5' have a sleeve internal diameter 15 of the sleeve shell 3 and a bore 7 in the sleeve head 4 which is smaller in comparison with the internal diameter. A respective bead body 6, 6' of the beaded chain ends to be connected is received in the socket sleeve 5 or the plug sleeve 5'. The cord 8 of the beaded chain 2, on which the bead bodies 6, 6' of the beaded chain are fastened at substantially equal spacings, is thus threaded through the bore 7 so that the last bead body 6, 6' is seated in one of the sleeves 5, 5', and the penultimate bead body 6", which is still located outside the respective sleeve 5, 5' fixes the respective sleeve 5, 5' to the beaded chain ends. The two sleeves 5, 5' have respective shell surfaces 9, 12 with profiles as shown and described in the connection with the subsequent Figures.

In FIG. 2, a rotationally symmetrical socket sleeve 5, with a bead body 6' seated in it, is shown in cross section. The socket sleeve 5 has a sleeve head 4 and a sleeve shell 3. The sleeve shell 3 has an internal shell surface 9 with a profile. The profile has a holding collar 10 and, axial to the bore 7, an internal, conical abutment region 11. The retaining collar 10 and the abutment region 11 are enlarged in diameter in comparison with the internal diameter 15 of the sleeve.

The plug sleeve 5' shown in FIG. 3 corresponds to the socket sleeve shown in FIG. 2. The last bead body 6 of a beaded chain end to be connected by the connecting clasp 1 is likewise seated in the plug sleeve 5'. The last bead body 6 and the penultimate bead body 6" are connected by the cord 8. Moreover the cord 8 lies in the bore 7 in the sleeve head 4. The plug sleeve 5' likewise has a sleeve shell 3 and a sleeve head 4; the sleeve shell 3 has a shell external surface 12 with a profile. The profile includes firstly an external, conical abutment seating region 13 and then a retaining groove 14.

A retaining groove 14 then adjoins the sleeve head 4.

Cross sections of the sleeves 5, 5' are shown in FIGS. **4*a* and 4*b*, in plan views towards the sleeve heads 4 of the plug sleeve and the socket sleeve 5, 5'. These have different edges 16 of the shell surfaces 9, 12, due to the profiles. Furthermore, the bores 7 through the sleeve head 4 are represented along the longitudinal axis A, which runs perpendicular to the plane of the drawing, and the respective radial slot 17 passing through the sleeve shell 3 on one side Here FIG. 4*a* shows the socket sleeve 5 and FIG. 4*b* shows the plug sleeve 5'**.

The ends of the beaded chains are fastened to the sleeves 5, 5' in a manner in which the beaded chain 8 passes between the last two bead bodies 6, 6" into the slot 17 through the sleeve shell 3 to the bore 7 in the sleeve head 4, and the sleeve head is clamped in between these two bead bodies 6, 6'. The spacing of the two bead bodies 6, 6" on the cord 8 is then smaller than the thickness of the sleeve head 4, so that the respective sleeve 5, 5' is held on the beaded chain end with a stress applied by the cord 8. This connection can be released again, in that the cord 8 can be passed out of the bore 7 again through the slot 17.

When the plug sleeve 5' is plugged into the socket sleeve 5, the seating region 13 of the external shell surface 12 first acts as a centering means, in order to plug the sleeves 5, 5' together easily and quickly. On further pushing the plug sleeve 5' into the socket sleeve 5 to reach a firm connection, the sleeve shell 3 of the socket sleeve 5 is widened by the seating region of the plug sleeve 5' until the retaining collar 10 engages in the retaining groove 14. The sleeves 5, 5' are preferably structured so that the profiles in the connected state abut each other such that the sleeves 5, 5' are not under the stress of a force which presses the sleeve shells 3 together. The interengaging profiles effect the secure locking of the two sleeves 5, 5'. The opening force which is required to release the two sleeves 5, 5' is determined by the form of the retaining collar 10 and retaining collar 14, and also by the elasticity of the sleeve material.

The configuration of the shell surfaces 9, 12 of the sleeves 5, 5' with releasably interengaging profiles has the result that the sleeves 5, 5' can be plugged together in order to connect the respective ends of the beaded chains, and the profiles abut each other such that a predetermined opening force has to be used to release the connection. The opening force of the respective sleeves 5, 5' is here selected such that the socket sleeve and the plug sleeve release from each other when the tension on the two beaded chain ends exceeds a force which could give rise to strangulation or injuries, thereby entailed, of children; thus a regular use of the beaded chain 2 on the equipment provided for this is possible without limitations.

We claim:

1. A connecting clasp (1) for beaded chains (2) having a cord (8) and bead bodies (6, 6', 6") comprising:

a socket sleeve (5) and a plug sleeve (5') having an at least geometrical longitudinal axis (A) and designed to be plugged one into the other in the direction of said longitudinal axis (A), wherein:

each of said sleeves (5, 5') comprises a sleeve shell (3) and a sleeve head (4) integrally connected with said sleeve shell (3), each of said sleeves (5, 5') has an internal diameter that is larger than the external diameter of said bead bodies (6, 6', 6"), and is designed to receive at least one bead body (6, 6', 6"), said sleeve shell (3) of said socket sleeve (5) has a shell internal surface (9), said sleeve shell (3) of said plug sleeve (5') has a shell external surface (12), said shell internal surface (9) and said shell external surface (12) have interengaging profiles, each of said sleeve heads (4) has a bore (7) along said longitudinal axis (A) through said sleeve head (4) to receive said cord (8), each of said sleeve shells (3) has a slot (17) on one side through said sleeve shell (3) to said bore (7) for introducing said cord (8) into said bore (7), and said sleeves (5, 5') are designed to be released from each other by a predetermined opening force.

2. The connecting clasp according to claim 1, wherein at least one sleeve shell (3) is designed to be elastically fitted onto said sleeve surface (9, 12) of the other sleeve shell (3), with which it interengages.

3. The connecting clasp according to claim 1, wherein said predetermined opening force is in the region of 50N to 150N.

4. The connecting clasp according to claim 1, wherein said interengaging profiles comprise a retaining collar (10) on one sleeve shell (3) and a retaining groove (14) on the other sleeve shell (3).

5. A connecting clasp (1) for beaded chains (2) having a cord (8) and bead bodies (6, 6', 6") comprising:

two substantially rotationally symmetric sleeves (5, 5") comprising a socket sleeve (5) and a plug sleeve (5') having an at least geometrical longitudinal axis (A) and designed to be plugged one into the other in the direction of said longitudinal axis (A), wherein each of said sleeves (5, 5') comprises a sleeve shell (3) and a sleeve head (4) integrally connected with said sleeve shell (3), each of said sleeves (5, 5') has an internal diameter that is larger than the external diameter of said bead bodies (6, 6', 6") and is designed to receive at least one bead body (6, 6', 6"), said sleeve shell (3) of said socket sleeve (5) has a shell internal surface (9), said sleeve shell (3) of said plug sleeve (5') has a shell external surface (12), said shell internal surface (9) and said shell external surface (12) have releasably interengaging profiles around said surfaces, each of said sleeve heads (4) has a bore (7) along said longitudinal axis (A) through said sleeve head (4) to receive said cord (8), each of said sleeve shells (3) has a slot (17) on one side through said sleeve shell (3) to said bore (7) for introducing said cord (8) into said bore (7), and said sleeves (5, 5') are designed to be released from each other by a predetermined opening force.

6. The connecting clasp (1) according to claim 5, wherein said sleeve shell (3) of said plug sleeve (5') has an external conical seating region (13) designed to plug into said sleeve shell (3) of said socket sleeve (5) and said socket sleeve (5) has an internal conical abuttment region (11) corresponding to said external conical seating region (13).

7. The connecting clasp (1) according to claim 6, wherein said profile of said plug sleeve (5') comprises a retaining groove (14) and said profile of said socket sleeve (5) comprises a retaining collar corresponding to said profile of said plug sleeve (5').

* * * * *